(12) United States Patent
Kulkarni

(10) Patent No.: US 6,933,944 B2
(45) Date of Patent: Aug. 23, 2005

(54) DYNAMIC COMPUTATION OF CHIPSET-SUPPORTED ACCELERATED GRAPHICS PORT APERTURE SIZES

(75) Inventor: Sunil A. Kulkarni, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 444 days.

(21) Appl. No.: 10/104,042

(22) Filed: Mar. 21, 2002

(65) Prior Publication Data

US 2003/0179209 A1 Sep. 25, 2003

(51) Int. Cl.$^7$ ............................................. G06F 12/02
(52) U.S. Cl. ..................... 345/543; 345/520; 710/10; 710/305; 710/313; 714/30
(58) Field of Search ............................... 345/543, 547, 345/520; 710/10, 23, 56, 305, 313; 714/29–30

(56) References Cited

U.S. PATENT DOCUMENTS

| | | | | |
|---|---|---|---|---|
| 5,999,743 A | * | 12/1999 | Horan et al. | 710/56 |
| 6,057,863 A | * | 5/2000 | Olarig | 345/520 |
| 6,546,449 B1 | * | 4/2003 | Aleksic et al. | 710/312 |

OTHER PUBLICATIONS

Intel, *Draft Accelerated Graphics Port (AGP) V3.0 Interface Specification*, Rev. 0.95, May 2001, pp. 104–127.
PCI Special Interest Group, *PCI Local Bus Specification*, Revision 2.3, Oct. 31, 2001, pp. ii–viii, 207–208.

* cited by examiner

*Primary Examiner*—Matthew C. Bella
*Assistant Examiner*—Mackly Monestime
(74) *Attorney, Agent, or Firm*—Marger Johnson & McCollom P.C.

(57) ABSTRACT

Methods and apparatus for use with AGP-capable computer systems are disclosed. Since each AGP-capable chipset can have a unique range of graphics port aperture sizes that it supports, current graphics port aperture drivers are chipset-specific, with hard-coded tables of supported graphics aperture sizes. Described herein is a driver that dynamically ascertains the range of supported graphics aperture port sizes for an attached AGP-capable chipset, thus allowing this driver to be ported between different chipsets without manual reconfiguration and recompiling. The method employed in the driver sends one or more test aperture size values to a register resident in the chipset, and then reads what is written to see if the chipset changed any of the bits of the test value. The method infers supported sizes from examining which, if any bits, were changed by the chipset.

27 Claims, 7 Drawing Sheets

| STORED APSIZE VALUE: | A B C D 0 0 E F G H I J | VALID APSIZE RANGE: |
|---|---|---|
| DEVICE 100 CONTENTS: | A B C D 0 0 E F G H I J | 4MB–4096MB |
| DEVICE 200 CONTENTS: | 1 1 C D 0 0 E F G H 0 0 | 16MB–1024MB |
| DEVICE 300 CONTENTS: | 1 1 1 1 0 0 E F G H I J | 4MB–256MB |

Fig. 4 (Prior Art)

VALID APSIZE CODES

| BIT NO.: | 11 | 10 | 9 | 8 | 7 | 6 | 5 | 4 | 3 | 2 | 1 | 0 | APERTURE SIZE: |
|---|---|---|---|---|---|---|---|---|---|---|---|---|---|
| | 1 | 1 | 1 | 1 | 0 | 0 | 1 | 1 | 1 | 1 | 1 | 1 | 4MB |
| | 1 | 1 | 1 | 1 | 0 | 0 | 1 | 1 | 1 | 1 | 1 | 0 | 8MB |
| | 1 | 1 | 1 | 1 | 0 | 0 | 1 | 1 | 1 | 1 | 0 | 0 | 16MB |
| | 1 | 1 | 1 | 1 | 0 | 0 | 1 | 1 | 1 | 0 | 0 | 0 | 32MB |
| | 1 | 1 | 1 | 1 | 0 | 0 | 1 | 1 | 0 | 0 | 0 | 0 | 64MB |
| | 1 | 1 | 1 | 1 | 0 | 0 | 1 | 0 | 0 | 0 | 0 | 0 | 128MB |
| | 1 | 1 | 1 | 1 | 0 | 0 | 0 | 0 | 0 | 0 | 0 | 0 | 256MB |
| | 1 | 1 | 1 | 0 | 0 | 0 | 0 | 0 | 0 | 0 | 0 | 0 | 512MB |
| | 1 | 1 | 0 | 0 | 0 | 0 | 0 | 0 | 0 | 0 | 0 | 0 | 1024MB |
| | 1 | 0 | 0 | 0 | 0 | 0 | 0 | 0 | 0 | 0 | 0 | 0 | 2048MB |
| | 0 | 0 | 0 | 0 | 0 | 0 | 0 | 0 | 0 | 0 | 0 | 0 | 4096MB |

RESERVED BITS

Fig. 5

| STORED APSIZE VALUE: | A B C D 0 0 E F G H I J | VALID APSIZE RANGE: |
|---|---|---|
| DEVICE 100 CONTENTS: | A B C D 0 0 E F G H I J | 4MB-4096MB |
| DEVICE 200 CONTENTS: | 1 1 C D 0 0 E F G H 0 0 | 16MB-1024MB |
| DEVICE 300 CONTENTS: | 1 1 1 1 0 0 E F G H I J | 4MB-256MB |

Fig. 7

| Iteration | TestVal | DEVICE 100 | | | | DEVICE 200 | | | | DEVICE 300 | | | |
|---|---|---|---|---|---|---|---|---|---|---|---|---|---|
| | | TestVal = ReadVal? | MinSize | MaxSize | NumSupportedSizes | TestVal = ReadVal? | MinSize | MaxSize | NumSupportedSizes | TestVal = ReadVal? | MinSize | MaxSize | NumSupportedSizes |
| 0 | 0F3F | Y | 0F3F | 0F3F | 1 | N | 0000 | 0000 | 0 | Y | 0F3F | 0F3F | 1 |
| 1 | 0F3E | Y | 0F3F | 0F3E | 2 | N | 0000 | 0000 | 0 | Y | 0F3F | 0F3E | 2 |
| 2 | 0F3C | Y | 0F3F | 0F3C | 3 | Y | 0F3C | 0F3C | 1 | Y | 0F3F | 0F3C | 3 |
| 3 | 0F38 | Y | 0F3F | 0F38 | 4 | Y | 0F3C | 0F38 | 2 | Y | 0F3F | 0F38 | 4 |
| 4 | 0F30 | Y | 0F3F | 0F30 | 5 | Y | 0F3C | 0F30 | 3 | Y | 0F3F | 0F30 | 5 |
| 5 | 0F20 | Y | 0F3F | 0F20 | 6 | Y | 0F3C | 0F20 | 4 | Y | 0F3F | 0F20 | 6 |
| 6 | 0F00 | Y | 0F3F | 0F00 | 7 | Y | 0F3C | 0F00 | 5 | Y | 0F3F | 0F00 | 7 |
| 7 | 0E00 | Y | 0F3F | 0E00 | 8 | Y | 0F3C | 0E00 | 6 | N | 0F3F | 0F00 | 7 |
| 8 | 0C00 | Y | 0F3F | 0C00 | 9 | Y | 0F3C | 0C00 | 7 | | | | |
| 9 | 0800 | Y | 0F3F | 0800 | 10 | Y | 0F3C | 0C00 | 7 | | | | |
| 10 | 0000 | Y | 0F3F | 0000 | 11 | N | 0F3C | 0C00 | 7 | | | | |

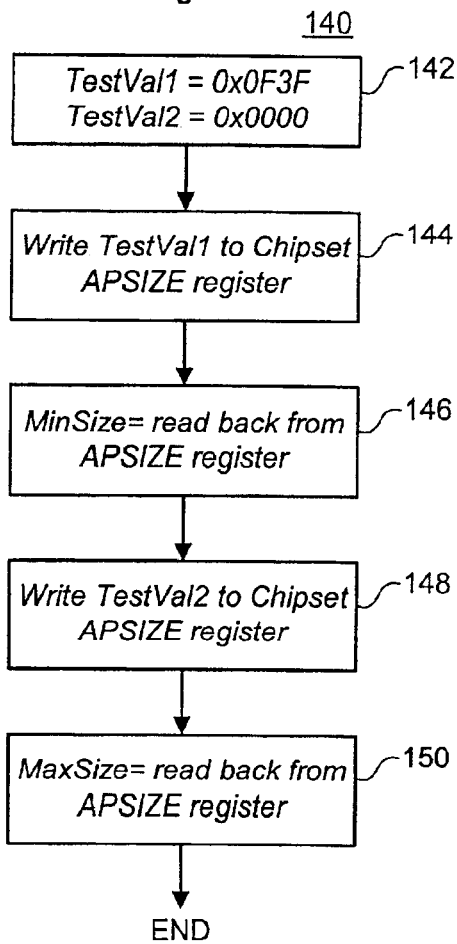
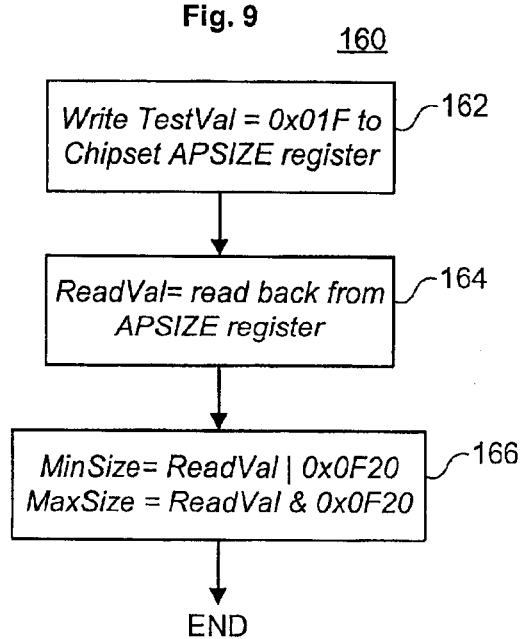

DYNAMIC COMPUTATION OF CHIPSET-SUPPORTED ACCELERATED GRAPHICS PORT APERTURE SIZES

FIELD OF THE INVENTION

This present invention relates generally to computers having Accelerated Graphics Port (AGP) functionality, and more particularly to capability detection for AGP-capable chipsets.

BACKGROUND OF THE INVENTION

Most computers connect to or include a graphical display device (e.g., a cathode-ray-tube monitor or liquid crystal display) that allows a user to visually interact with different software applications such as word processors, spreadsheets, web browsers, e-mail, drawing packages, DVD or streamed video, and games. The computer renders graphical data to a frame buffer, and that data is then converted to a viewable display. Because graphics display involves many straightforward pixel manipulation tasks that are performed repetitively, it is typical for the main processor of the computer to offload some graphics-related tasks to a graphics processor having direct access to frame buffers. For example, sophisticated 3D drawing packages, 3D computer games, etc., may use the graphics processor to render motion sequences of three-dimensional scenes having a high degree of complexity.

FIG. 1 shows a typical desktop computer system, including a computer 20 in block diagram form. Host processor 22 communicates with a memory interface 24 (sometimes called a memory controller, bridge, or controller-hub) across front-side bus FSB. Memory interface 24 has at least three other ports: a memory bus to main system memory 26; an AGP bus to graphics processor 40; and an I/O hub interface bus to I/O controller hub 30. I/O controller hub 30 provides ports for a variety of other connection types, including ATA/ATAPI (AT Attachment/ATA Packet Interface) connections for devices such as magnetic hard disk drives and optical disk drives, USB (Universal Serial Bus) ports, a PCI (Peripheral Component Interconnect) bus serving PCI expansion slots, and a connection to a low-speed I/O interface circuit 50 that interfaces with parallel ports, floppy disk drive ports, serial ports, mouse and keyboard ports, etc. Together, memory interface 24 and hub 30 are often referred to as a "chipset".

Graphics processor 40 typically connects to its own dedicated graphics memory 42, which graphics processor 40 uses for frame buffering, z-buffering, polygon data storage, etc. When the computer is running non-graphics-intensive applications, the demands placed upon memory 42 are modest. But when the computer runs graphics-intensive applications such as those that use 3D rendering, graphics processor 40 may require dramatically more memory capacity to create high-quality graphics.

An AGP-capable computer reduces the need for a large graphics memory 42 to support graphics-intensive applications. Instead, the AGP bus provides the graphics processor with sophisticated, pipelined high-speed access into a dedicated area of system memory 26. Graphics processor 40 can then store and retrieve selected graphical elements—such as texture maps—in system memory 26 when graphics memory demands are high. Since system memory pages can be dynamically allocated and de-allocated to graphics processor 40, system memory can be shared such that it is available to other applications when unneeded by the graphics processor.

One problem with allowing graphics processor 40 to use a portion of system memory 26 is that the computer's operating system uses a virtual paged memory system that cannot guarantee a large contiguous block of memory addresses to the graphics processor. Rather than have the graphics processor track non-contiguous memory space and spend time scattering/gathering graphics data to virtual pages, an AGP-capable memory interface 24 provides such a function for the graphics processor.

FIG. 2 shows a memory map 60 for a typical computer. Within the physical address space, the physical RAM (Random Access Memory) occupies a lower range of addresses. Above the top of the physical memory lies memory-mapped I/O space, e.g., valid addresses that can be assigned to various I/O devices. Within the memory-mapped I/O space, it is usually possible to find a large enough block of free contiguous addresses to serve the needs of the graphics processor.

Graphics aperture 70 represents the total memory area available for allocation to the graphics processor. Graphics aperture 70 comprises a set of same-sized AGP aperture pages, of which page 72 is typical. Since these aperture pages do not represent physical memory blocks, each aperture page is mapped to a valid physical page in system memory 26, and the mapping is stored in Graphics Address Remapping Table (GART) 74. When the graphics processor accesses an address that falls within aperture 70, memory interface 24 looks up the appropriate entry in GART 74 and performs the memory access with the corresponding physical page. This operation is transparent to the graphics processor.

AGP allows the operating system to select one of several different fixed graphics aperture sizes. AGP defines the legal aperture sizes of 4, 8, 16, 32, 64, 128, 256, 512, 1024, 2048, and 4096 MB (megabytes). An AGP-capable memory interface is not required to support all of these sizes, but must support at least some contiguous subrange of these sizes. FIG. 3 depicts an exemplary range of supported aperture sizes, falling between a minimum aperture size 80 and a maximum aperture size 82.

The memory interface maintains the current selected aperture size in coded form in an APSIZE register. The valid APSIZE codes, and their corresponding aperture sizes, are illustrated in FIG. 4. When a memory interface does not support all possible aperture sizes, it is required to hard-wire appropriate bits of its APSIZE register so that it is impossible for an operating system to set an unsupported aperture size.

BRIEF DESCRIPTION OF THE DRAWING

The invention may be best understood by reading the disclosure with reference to the drawing, wherein:

FIG. 4 lists, for each legal AGP aperture size, its corresponding APSIZE code;

FIG. 5 illustrates, for three different memory interfaces supporting three different ranges of AGP aperture sizes, the effect of storing a given APSIZE value in each of those devices' APSIZE register;

FIG. 7 illustrates intermediate and final results from executing the method of FIG. 6 on the three different memory interfaces of FIG. 5; and FIGS. 8 and 9 contain flowcharts for two additional method embodiments.

DETAILED DESCRIPTION OF THE EMBODIMENTS

Figure 1:
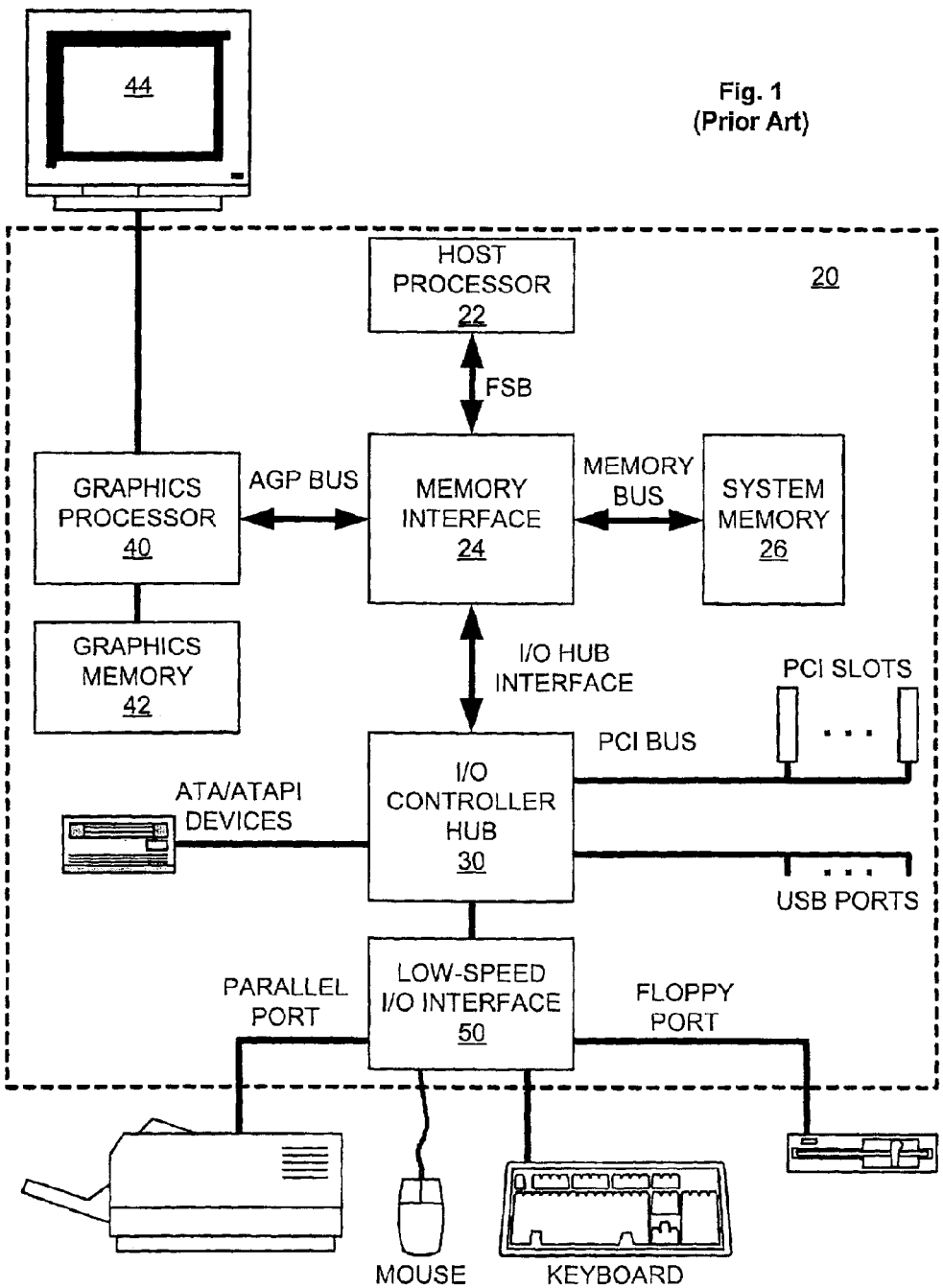
FIG. 1 contains a block diagram for a typical AGP-enabled computer system and attached peripherals.
Figure 2:
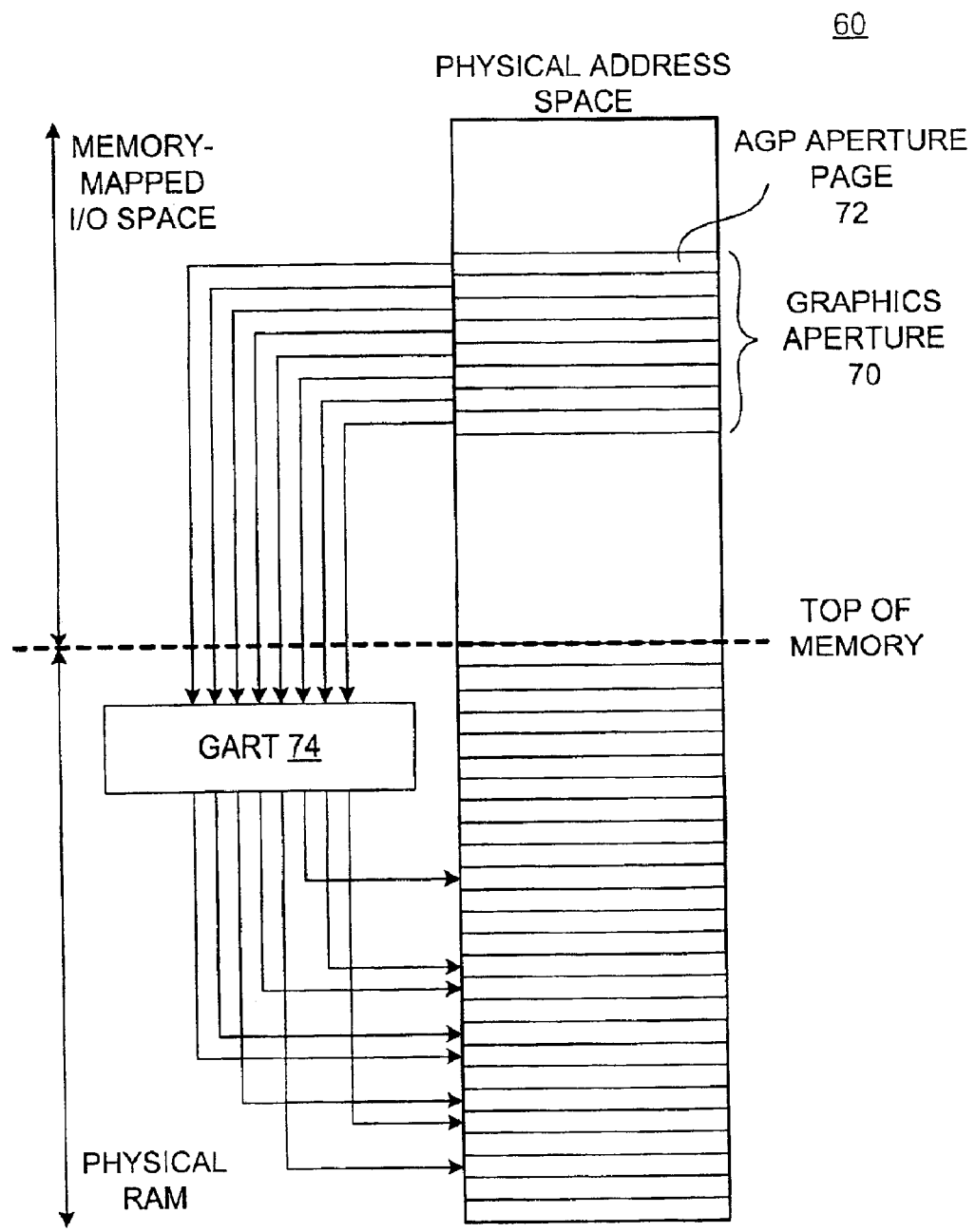
FIG. 2 shows a memory map, illustrating a graphics aperture remapping function.
Figure 3:
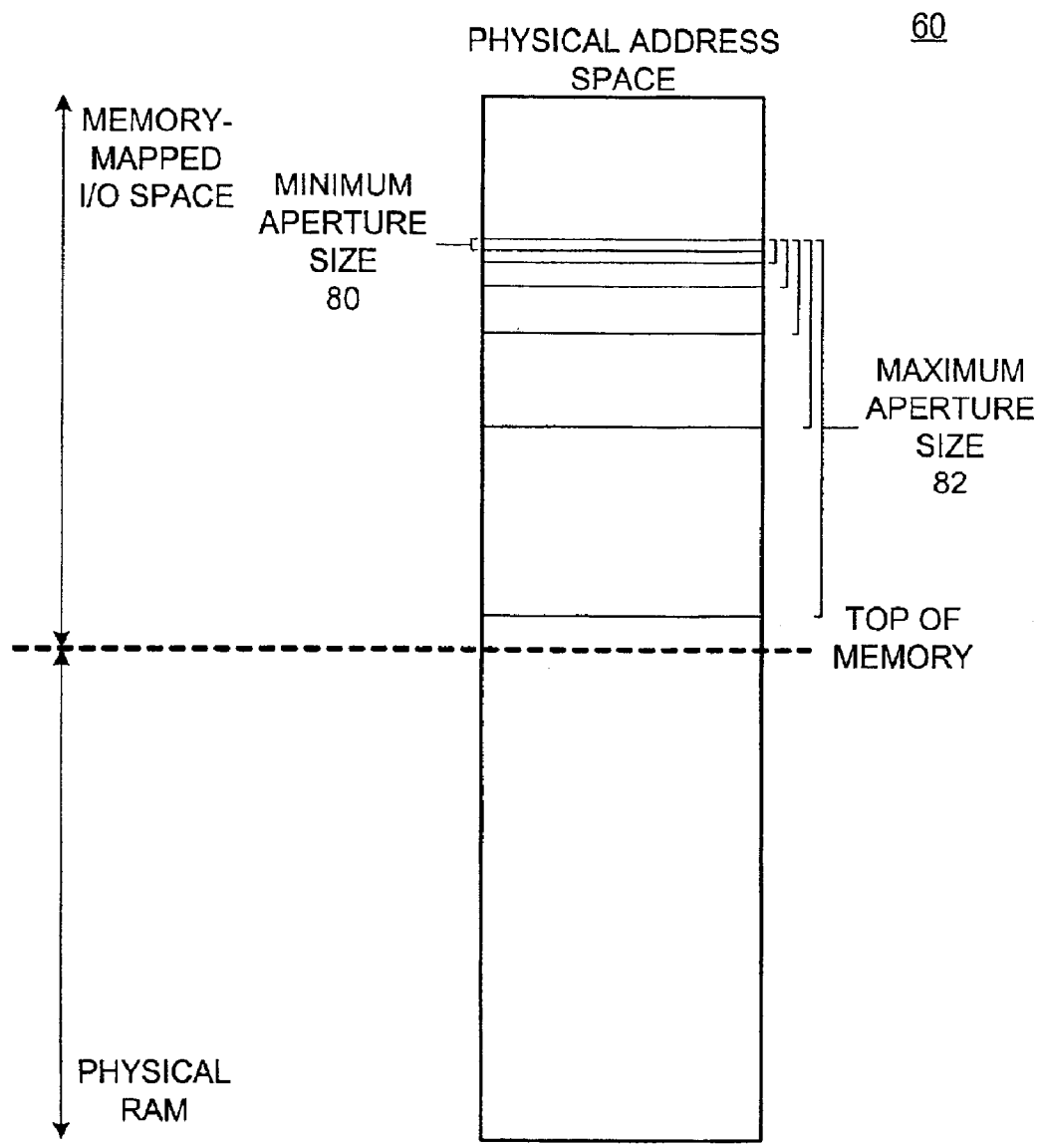
FIG. 3 shows, superimposed on a memory map, a range of aperture sizes supported by a memory interface.

The range of graphics aperture sizes supported by a memory interface is needed by the operating system, which selects and then uses a graphics aperture. The GART driver is responsible for reading the currently selected aperture size from the memory interface's APSIZE register, and then populating the GART with pointers into allocated sections of system memory, according to that size. Presently, each different memory interface device type has its own unique GART driver, with hardcoded values indicating the APSIZE register bit patterns supported by the memory interface, and the number of such patterns. Each time a different memory interface is released, then, a new GART driver must be created, compiled, and distributed with the operating system. This driver has the hardcoded APSIZE register bit patterns for that memory interface. Use of an incorrect driver with this prior art approach is possible, and could have harmful effects upon a system. Even if in most cases, through careful design, such effects can be avoided, the requirement for individual, non-portable drivers for each memory interface requires administrative effort.

In accordance with the embodiments described herein, a GART driver that can detect the supported aperture sizes for any AGP-capable memory interface is disclosed. Rather than relying on hardcoded supported aperture size lists, this driver dynamically detects the supported aperture sizes during system startup. Preferably, this alleviates the need for GART driver/memory interface pairing that existed in the prior art.

The described embodiments exploit the AGP requirement that a memory interface hardcode certain bits of its APSIZE register to avoid the unpredictable results of an unsupported aperture size written to that register. These embodiments "test" the APSIZE register with different values, writing them to the register and then reading back what was actually stored, and then use the results of this write/read to infer what aperture sizes a memory interface actually supports.

As an introduction to the embodiments, FIG. 5 illustrates a write to the APSIZE registers of three hypothetical memory interfaces. Device 100 supports all legal graphics aperture sizes. Device 200 supports graphics apertures in the range 16 MB to 1024 MB. And device 300 supports graphics apertures in the range 4 MB to 256 MB.

The stored APSIZE value is represented by the bit string "ABCD00EFGHIJ", where each alphabetical placeholder represents a bit that can have a binary value "1" or "0", depending on the desired aperture size value. The bits in bit positions 6 and 7 (counting "J" as the LSB and assigning it bit position 0) are always set to "0" for compatibility with prior versions of AGP.

Device 100 can be set to use any aperture size defined by AGP. Thus the bit string "ABCD00EFGHIJ", no matter what aperture size it represents, will be stored exactly in device 100's APSIZE register.

Device 200 does not support either the two largest (2048 and 4096 MB) or two smallest (4 and 8 MB) aperture sizes defined by AGP. Accordingly, AGP requires that device 200 hardcode the bits at APSIZE register bit positions 10 and 11 to "1" so that an operating system cannot inadvertently unset those bits to indicate a 2048 or 4096 Mb aperture size. Likewise, AGP requires that device 200 hardcode the bits at bit positions 0 and 1 to "0" so that an operating system cannot inadvertently set those bits to indicate a 4 or 8 MB aperture size. Thus, when the value "ABCD00EFGHIJ" is written to device 200's APSIZE register, what is stored is "11CD00EFGH00", no matter what the value of "A", "B", "I", or "j".

Device 300 supports all of the smaller aperture sizes, but does not support the four largest apertures sizes (512, 1024, 2048, and 4096 MB) defined by AGP. Thus device 300 hardcodes the bits at APSIZE register bit positions 8, 9, 10, and 11 to "1", and "ABCD00EFGHIJ" is always stored in this APSIZE register as "111100EFGHIJ".

The described embodiments can detect the aperture sizes supported by devices 100, 200, and 300, or any other AGP-capable memory interface. These embodiments write test aperture size values to the APSIZE register to discover whether any set or unset bits exist in the register. If these bits exist, the embodiments set the range of supported aperture sizes accordingly.

Figure 6:
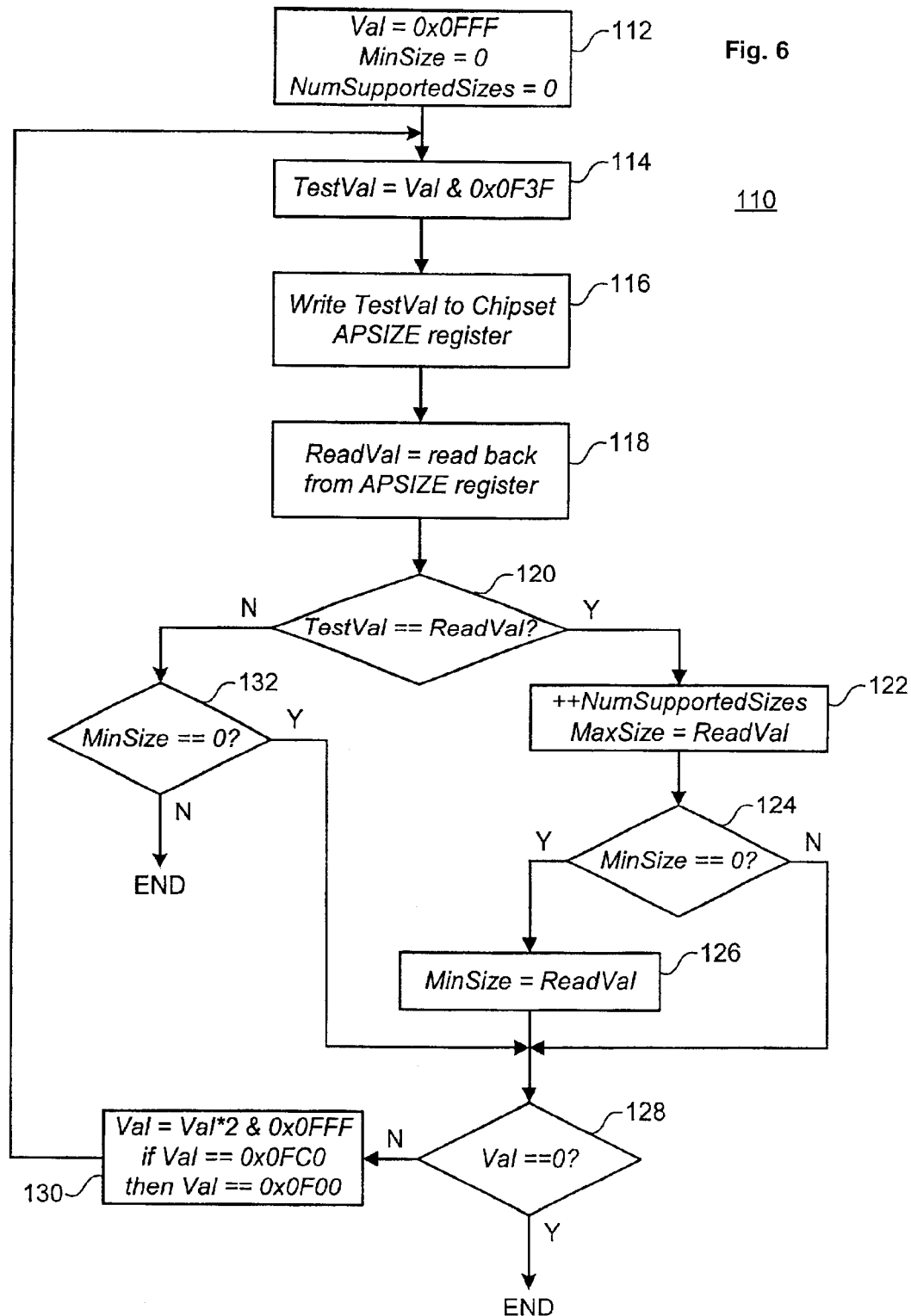
FIG. 6 contains a flowchart for a method embodiment of the invention.

FIG. 6 contains a flowchart 110 for a first method according to an embodiment of the invention. The method first initializes several values at block 112. The variable Val is set to 0x0fff, where the prefix 0x indicates hexidecimal notation. The variables MinSize and NumSupportedSizes are initialized to 0.

At block 114, the variable TestVal receives the result of ANDing Val with the mask value 0x0f3f. The AND operation unsets bits 6 and 7, such that TestVal now contains the valid AGP aperture size code for a 4 MB aperture.

At block 116, TestVal is written to the APSIZE register on the memory interface. In current implementations, the address of this register is the address stored in the PCI configuration space AGP capability pointer CAPPTR, plus an address offset of 0x14. Block 118 immediately reads the value back from the APSIZE register and stores it in a variable ReadVal.

Decision block 120 compares TestVal to ReadVal. If the two values are equal, it can be inferred that the memory interface supports the aperture size represented by the code currently residing in TestVal. If the two are not equal, it can be inferred that the memory interface does not provide support for this aperture size. In the first case, block 122 increments NumSupportedSizes and sets MaxSize to the current ReadVal. Also, if MinSize has not been set, decision block 124 and block 126 set MinSize to ReadVal as well.

If decision block 120 finds instead that TestVal and ReadVal are not equal, control is transferred to decision block 132. Block 132 tests whether MinSize has been set—if so, the failure at block 120 indicates that the last valid aperture size occurred on the last iteration, and the method exits. If MinSize has not been set, however, the method is allowed to iterate since the smallest supported size has not yet been found.

Block 128 tests Val. If Val is 0, the largest aperture size has been tested and the method can exit. Otherwise, Val is shifted at block 130 and control loops back to block 114 for the next iteration. The shift at block 130 can be accomplished with a logical shift or by multiplying Val by two as shown. The shifted value is masked by the value 0x0fff to prevent the bits in the high-order nibble from becoming set. Also, the shifted value is tested against the value 0x0fc0; if these are equal, the lowest set bit has shifted to bit 6 of the aperture code. Since bits 6 and 7 are reserved bits, these bits are skipped in the iteration sequence by setting Val to 0x0f00 when Val equals 0x0fc0.

FIG. 7 shows the results of performing the method of FIG. 6 on the APSIZE registers of devices 100, 200, and 300 of FIG. 5.

FIG. 8 contains a flow chart 140 for an alternative method embodiment of the invention. Although this embodiment may not actually verify that any particular aperture size code is valid, it should reliably indicate the MinSize and MaxSize values for an AGP-conforming memory interface. This embodiment uses two test values, TestVal1 and TestVal2. Block 142 initializes TestVal1 to 0x0f3f, the aperture size code for a 4 MB aperture size, and TestVal2 to 0x0000, the aperture size code for a 4096 MB aperture size. Block 144 writes TestVal1 to the APSIZE register, and then block 146 reads what was actually written. If any of the least significant bits of the APSIZE register are hardwired to "0", the returned value will have those bits of TestVal1 zeroed out. Consequently, the returned value represents the minimum supported size, and can be set directly to MinSize.

Block 148 then writes TestVal2 to the APSIZE register, and block 150 reads what was actually written. If any of the most significant bits of the APSIZE register are hardwired to "1", the returned value will have those bits of TestVal2 set. Consequently, the returned value represents the maximum supported aperture size, and can be set directly to MaxSize.

If the GART driver executing the method of FIG. 8 needs to know the number of supported sizes, several methods are available for determining such a value. For instance, the maximum number of supported sizes is 11; the actual number supported by a device can be determined by subtracting from 11 both the number of unset bits in MinSize (ignoring bits 6 and 7) and the number of set bits in MaxSize.

FIG. 9 contains a flow chart 160 for another alternate method embodiment. The method of FIG. 9, however, requires that an illegal aperture size code be written to the APSIZE register. Unless an embodiment can operate during a time when other uses of the APSIZE register can be prevented, this method should probably not be used. Nevertheless, this method will determine the MinSize and MaxSize values supported.

The method of FIG. 9 guesses that at least one aperture size near the middle of the defined range of sizes will be supported—in this case 128 MB. Block 162 writes the bitwise inverse of the 128 MB aperture size code (a TestVal of 0x01f, again ignoring bits 6 and 7) to the APSIZE register, and block 164 reads what was actually written as ReadVal. If some of the five least significant bits are unset in ReadVal, this indicates hardwired unset bits. Likewise, if some of the five most significant bits are set in ReadVal, this indicates hardwired set bits. At block 166, MinSize can be inferred directly by ORing ReadVal with the 128 MB aperture size code 0x0f20. MaxSize can be inferred directly by ANDing ReadVal with the 128 MB aperture size code.

One caveat to the method of FIG. 9 is that the "guess" of a supported aperture size may be incorrect. If in ReadVal, both bits 4 and 5 are returned either set or unset, uncertainty remains. This uncertainty can be alleviated by shifting the "guess" to the left (if both bits are returned unset) or right (if both bits are returned set) and repeating the process until both bits at the transition point are not returned equal.

With any of these methods, it is likely that the driver will be required to relate the APSIZE value to the actual size of the corresponding graphics aperture. This could be accomplished with a table lookup. Another possibility is to count NumUnset, the number of unset bits in an aperture size code (this time including bits 6 and 7), and calculate the value $2^{NumUnset}$. This value represents the size of the graphics aperture in megabytes.

It is intended that the described methods be used in some sort of boot and/or driver routine to set MinSize, MaxSize, and NumSupportedSizes for use by the GART driver and operating system. There are several possibilities for when the routine would be actually executed. One possibility is to run the routine each time the computer boots. Another possibility it to run the routine once with each system upon initial configuration and store the supported values in operating system registry values, flash memory, etc. Or, the routine could run the first time a GART driver is called upon to populate a GART.

Since each of these methods is particularly amenable to software implementation, embodiments of the invention include any computer-readable media that includes instructions usable by a computer to perform a method according to an embodiment of the invention. Thus a flash memory, RAM memory, hard drive, optical disk, etc. can be an embodiment of the invention if it includes a driver code segment that causes a processor to operate according to an embodiment of the invention.

Likewise, an AGP-capable computer system can also be an embodiment of the invention. For instance, a system according to an embodiment can comprise a processor group with at least one main processor, system memory, a graphics processor, and a memory interface connected to the processor group, system memory, and graphics processor by separate buses. The memory interface must, however, allow the graphics processor to store and retrieve data from the system memory through a graphics aperture, and must support a finite set of graphics aperture sizes. The final necessary component of this system is a driver to configure the graphics aperture, comprising a dynamic supported-aperture-size detector to determine the set of graphics aperture sizes supported by the memory interface.

The specific examples that have been presented are applicable to devices and drivers conforming to "Draft AGP V3.0 Interface Specification", Rev. 0.95, May 2001. It is acknowledged that AGP may evolve in the future, and that competing technologies with similar capabilities may also be developed. Accordingly, the scope of the present invention is not limited to AGP V3.0. To the extent that the broad teachings disclosed herein are applicable to other graphics-shared-memory technologies, the scope of the claims is intended to cover such technologies.

One of ordinary skill in the art will recognize that the concepts taught herein can be tailored to a particular application in many other advantageous ways. In particular, those skilled in the art will recognize that the illustrated embodiments are but one of many alternative implementations that will become apparent upon reading this disclosure. For instance, the first method embodiment steps through supported aperture sizes from low to high—this could just as well be done high to low, or in some other pattern such as a binary search for the endpoints. Also, test aperture size value could be based in part on what was learned from writing/reading previous test aperture size values. Such minor modifications are encompassed within the invention, and are intended to fall within the scope of the claims.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. A method of determining the graphics aperture sizes supported by a memory interface, comprising:
   storing a first test register size value to an aperture size register on the memory interface;
   reading a first aperture register size value from the aperture size register; and
   inferring from any differences between the first test register size value and the first aperture register size value whether at least one first graphics aperture size is supported by the memory interface.

2. The method of claim 1, further comprising:
   storing a second test register size value to the aperture size register;
   reading a second aperture register size value from the aperture size register, and
   inferring from any differences between the second test register size value and the second aperture register size value whether at least one second graphics aperture size is supported by the memory interface.

3. The method of claim 2, wherein the first test register size value contains a set bit in each potentially settable bit position.

4. The method of claim 3, wherein the second test register size value contains an unset bit in each potentially settable bit position.

5. The method of claim 3, further comprising determining which of the set bits remain set in the first aperture register size value, and constructing the second test register size value with an unset bit in each of the bit positions corresponding to those set bits.

6. The method of claim 1, wherein the first test register size value contains unset bits in its uppermost potentially settable bit positions and set bits in its lowermost potentially settable bit positions.

7. The method of claim 6, wherein inferring comprises examining which, if any, of the uppermost bits of the first test register size value remain unset in the first aperture register size value, and setting the maximum aperture size according to the highest-order bit that remained unset.

8. The method of claim 7, further comprising, when none of the uppermost bits remain unset in the first aperture register size value, selecting a second test register size value, with a larger set of uppermost bit positions unset than were unset in the first test register size value, and writing the second test register size value to the aperture size register.

9. The method of claim 7, wherein inferring further comprises examining which, if any, of the lowermost bits of the first test register size value remain set in the first aperture register size value, and setting the minimum aperture size according to the lowest-order bit that remained set.

10. The method of claim 6, wherein, in the first test register size value, the division between the uppermost bit positions and the lowermost bit positions occurs at a bit position corresponding to a default aperture register size.

11. The method of claim 1, further comprising repeating the method for multiple test register size values selected from a group containing all possible aperture register size values, and for each selected test register size value, inferring, from any differences between that test register size value and its corresponding read aperture register size value, whether that possible aperture register size value is supported.

12. The method of claim 11, further comprising arranging the order in the group containing all possible aperture register size values from smallest possible aperture register size value to largest possible aperture register size value, and selecting test register size values in ascending order from that group.

13. The method of claim 12, wherein inferring comprises, upon finding the first test register size value equal to its corresponding read aperture register size value, setting the minimum supported aperture size corresponding to that test register size value.

14. The method of claim 13, wherein inferring further comprises, after finding the last test register size value equal to its corresponding read aperture size value, setting the maximum supported aperture size corresponding to that teat register size value.

15. The method of claim 11, further comprising translating a supported aperture register size value to its corresponding aperture register size.

16. The method of claim 1, further comprising executing the method, in a system containing a memory interface, upon startup of that system in order to configure a driver for that memory interface.

17. An apparatus comprising computer-readable media containing instructions that, when executed or interpreted by a processor group comprising at least one processor in communication with a memory interface, cause that processor group to perform a method comprising:
   storing a first test register size value to a graphics aperture size register on the memory interface;
   reading a first aperture register size value from the aperture size register, and
   inferring from any differences between the first test register size value and the first aperture register size value whether at least one first graphics aperture size is supported by the memory interface.

18. The apparatus of claim 17, the method further comprising:
   storing a second test register size value to the aperture size register;
   reading a second aperture register size value from the aperture size register; and
   inferring from any differences between the second test register size value and the second aperture register size value whether at least one second graphics aperture size is supported by the memory interface.

19. The apparatus of claim 18, wherein the first test register size value contains a set bit in each potentially settable bit position.

20. The apparatus of claim 19, wherein the second test register size value contains an unset bit in each potentially settable bit position.

21. The apparatus of claim 17, wherein the first test register size value contains unset bits in its uppermost potentially settable bit positions and set bits in its lowermost potentially settable bit positions.

22. The apparatus of claim 21, wherein inferring comprises:
   examining which, if any, of the uppermost bits of the first test register size value remain unset in the first aperture register size value, and setting the maximum aperture size according to the highest-order bit that remained unset; and
   examining which, if any, of the lowermost bits of the first test register size value remain set in the first aperture register size value, and setting the minimum aperture size according to the lowest-order bit that remained set.

23. The apparatus of claim 17, the method comprising repeating the method for multiple test register size values selected from a group containing all possible aperture register size values, and for each selected test register size value, inferring, from any differences between that test register size value and its corresponding read aperture register size value, whether that possible aperture register size value is supported.

24. The apparatus of claim 23, the method further comprising arranging the order in the group containing all possible aperture register size values from smallest possible aperture register size value to largest possible aperture register size value, and selecting test register size values in ascending order from that group.

25. A computer system comprising:

a processor group comprising at least one main processor;

system memory;

a graphics processor;

a memory interface connected to the processor group, system memory, and graphics processor by separate buses, the memory interface allowing the graphics processor to store and retrieve data from the system memory through a graphics aperture, the memory interface supporting a finite set of graphics aperture sizes; and a driver to configure the graphics aperture, the driver comprising a dynamic supported-aperture-size detector to determine the set of graphics aperture sizes supported by the memory interface.

26. The computer system of claim 25, wherein the driver comprises computer instructions, accessed by the processor group upon system startup, to determine the supported set of graphics aperture sizes by testing at least one register value in the memory interface.

27. The computer system of claim 25, wherein the memory interface comprises an aperture size register with at least one hard-wired bit to prevent the register from being loaded with a valid graphics aperture size outside of the range of the supported set of graphics aperture sizes, the dynamic supported-aperture-size detector determining the supported set of graphics aperture sizes by determining which bits of the register are hard-wired.

* * * * *

UNITED STATES PATENT AND TRADEMARK OFFICE
CERTIFICATE OF CORRECTION

PATENT NO. : 6,933,944 B2
APPLICATION NO. : 10/104042
DATED : August 23, 2005
INVENTOR(S) : Kulkarni It is certified that error appears in the above-identified patent and that said Letters Patent is hereby corrected as shown below:

At column 8, line 9, please replace "teat" with --test--

Signed and Sealed this

Eleventh Day of July, 2006

JON W. DUDAS
*Director of the United States Patent and Trademark Office*